United States Patent [19]

Dahlin

[11] Patent Number: 5,199,031
[45] Date of Patent: Mar. 30, 1993

[54] METHOD AND SYSTEM FOR UNIQUELY IDENTIFYING CONTROL CHANNEL TIME SLOTS

[75] Inventor: Jan E. Å S. Dahlin, Järfälla, Sweden

[73] Assignee: Telefonaktiebolaget L M Ericsson, Stockholm, Sweden

[21] Appl. No.: 662,414

[22] Filed: Feb. 28, 1991

Related U.S. Application Data

[63] Continuation-in-part of Ser. No. 575,645, Aug. 31, 1990, abandoned.

[51] Int. Cl.⁵ .................. H04J 3/12; H04B 7/212; H04Q 7/00
[52] U.S. Cl. ................. 370/110.1; 370/95.3; 370/105.4; 455/33.1; 455/54.1
[58] Field of Search .......... 370/95.1, 95.3, 85.7, 370/79, 110.1, 105.2, 105.4; 455/33.1, 34.1, 34.2, 53.1, 54.1; 379/58, 59, 60, 63

[56] References Cited

U.S. PATENT DOCUMENTS

| | | | |
|---|---|---|---|
| 4,519,068 | 5/1985 | Krebs et al. | 455/33.4 |
| 4,642,806 | 2/1987 | Hewitt et al. | 455/54.1 |
| 4,754,453 | 6/1988 | Eizenhöfer | 370/95.1 |
| 5,109,527 | 4/1992 | Akerberg | 455/34.1 |

Primary Examiner—Douglas W. Olms
Assistant Examiner—H. Kizou
Attorney, Agent, or Firm—Burns, Doane, Swecker & Mathis

[57] ABSTRACT

A method and system in which the control channels of an associated base station directly correspond to certain time slots of a radio channel frame, which also includes time slots being utilized for traffic channels. The time slots being utilized as control channels are marked with uniquely defined control channel indicators which include unique Sync Words and unique control channel identification words. The mobile station recognizes the uniquely defined control channel indicators and identifies those particular time slots as control channels so as to distinguish from the time slots which are not being used as control channels.

24 Claims, 5 Drawing Sheets

SLOT FORMAT MOBILE STATION TO LAND STATION (TRAFFIC CHANNEL)

(CONTROL CHANNEL)
SLOT FORMAT MOBILE TO LAND

SLOT FORMAT MOBILE STATION TO LAND STATION (TRAFFIC CHANNEL)

SLOT FORMAT LAND STATION TO MOBILE STATION (TRAFFIC CHANNEL)

(CONTROL CHANNEL)
SLOT FORMAT MOBILE TO LAND (CONTROL CHANNEL)
SLOT FORMAT LAND TO MOBILE

| CC SLOT 1 CONTROL CHANNEL | TC SLOT 2 TRAFFIC CHANNEL | TC SLOT 3 TRAFFIC CHANNEL | CC SLOT 4 CONTROL CHANNEL | TC SLOT 5 TRAFFIC CHANNEL | TC SLOT 6 TRAFFIC CHANNEL |
|---|---|---|---|---|---|

FIG.5

| CC SLOT 1 SYNCWORD 7 | TC SLOT 2 SYNCWORD 2 | TC SLOT 3 SYNCWORD 3 | CC SLOT 4 SYNCWORD 7 | TC SLOT 5 SYNCWORD 2 | TC SLOT 6 SYNCWORD 3 |
|---|---|---|---|---|---|

FIG.6A

| CC SLOT 1 SYNCWORD 7 | CC SLOT 2 SYNCWORD 8 | TC SLOT 3 SYNCWORD 3 | CC SLOT 4 SYNCWORD 7 | CC SLOT 5 SYNCWORD 8 | TC SLOT 6 SYNCWORD 3 |
|---|---|---|---|---|---|

FIG.6B

| CC SLOT 1 ESW X1 | CC SLOT 2 SYNCWORD 2 | TC SLOT 3 SYNCWORD 3 | CC SLOT 4 ESW X1 | CC SLOT 5 SYNCWORD 2 | TC SLOT 6 SYNCWORD 3 |
|---|---|---|---|---|---|

FIG.6C

| CC SLOT 1 ESW X1 | CC SLOT 2 ESW X2 | TC SLOT 3 SYNCWORD 3 | CC SLOT 4 ESW X1 | CC SLOT 5 ESW X2 | TC SLOT 6 SYNCWORD 3 |
|---|---|---|---|---|---|

FIG.6D

METHOD AND SYSTEM FOR UNIQUELY
IDENTIFYING CONTROL CHANNEL TIME
SLOTS

CROSS REFERENCE TO RELATED APPLICATIONS

This application is a continuation-in-part of an application assigned to the same assignee as the present application, filed Aug. 31, 1990, Ser. No. 07/575,645, now abandoned.

FIELD OF THE INVENTION

The present invention is directed to a mobile cellular radio telephone system having digital voice/traffic capacity wherein digital control channels may occupy the same radio channel time slots as voice/traffic channels. More specifically, the present invention relates to a method and system in which radio channel time slots are identified as control channel time slots.

BACKGROUND OF THE INVENTION

The first cellular mobile radio systems in public use were generally analog systems for the transmission of speech or other analog information. The systems comprised a plurality of radio channels for transmitting analog information between base and mobile stations by transmitting analog modulated radio signals. In general, the first cellular mobile radio systems had comparably large coverage cells. More recently, digital cellular mobile radio systems for public use have been designed.

Digital cellular mobile radio systems comprise digital channels for transmitting digital or digitized analog information between base and mobile stations, by transmitting digitally modulated radio signals. Digital cellular mobile radio systems offer substantial advantages over analog cellular mobile radio systems.

One digital mobile radio system intended to be used as a common system for many European countries is the GSM system. In European countries already having an analog cellular mobile system, the new digital GSM system is intended to be introduced as a new system which is independent of any existing analog system. The GSM system base and mobile stations have not been designed to be compatible with existing systems, however, they are designed to give optimum performances in various aspects in and of the system itself. Accordingly, there has been a comparatively great freedom of choice in technical matters when designing the GSM system.

Rather than introduce a new independent digital cellular mobile radio system, like the GSM system, in an area with an existing analog cellular system, it has been proposed to introduce a digital cellular mobile radio system which is designed for cooperation with the existing analog cellular mobile radio system. In order to obtain digital channels within the frequency band allotted to cellular mobile radio systems, there have been proposals to withdraw a number of radio channels allotted to the present analog mobile radio systems and use them in the digital cellular mobile radio system. Due to the proposed design of the digital mobile radio system, three or possibly six digital channels may occupy the same frequency band of one previous analog radio channel by using time division multiplexing. Accordingly, replacing some analog channels by digital channels in time division multiplex may increase the total number of channels.

The intended result is to gradually introduce the digital system and to increase the number of digital traffic channels while decreasing the number of analog traffic channels in the coexisting cellular systems. Analog mobile stations already in use will then be able to continue to use the remaining analog traffic channels. Meanwhile, new digital mobile stations will be able to use the new digital traffic channels. Dual-mode mobile stations will be able to use both the remaining analog and the new digital traffic channels.

With the addition of the new digital traffic channels, a corresponding need for new digital control channels arises. The conventional dual-mode systems for the most part utilize existing analog channels, such as dedicated frequencies, as the control channel.

SUMMARY OF THE INVENTION

The present invention has an objective to allow for a more flexible use of the existing traffic channels and the introduction of new control channels for control signalling. The present invention achieves this objective by providing a method and system wherein the control channels of an associated base station directly correspond to certain time slots of a message frame, which also comprises time slots being utilized for traffic channels. The time slots being utilized as control channels are readily detected because these time slots are marked with uniquely defined control channel indicators. In one embodiment, the control channel indicators may be uniquely defined synchronization words. In another embodiment, they may be uniquely defined control channel identification words. The mobile station recognizes the uniquely defined control channel indicators and identifies those particular time slots as control channels, thus distinguishing those time slots not being used as control channels. This operation allows for the channels which are not control channels to be skipped more rapidly, and therefore the process of going through a ranking list of the strongest signals to be used as control channels will be executed at a faster rate. Each of the unique control channel indicators associated with a specific time slot is distinguishable from corresponding bits in corresponding fields associated with adjacent time slots.

BRIEF DESCRIPTION OF THE DRAWINGS

FIG. 5 illustrates an example of a radio channel frame having six time slots in which control channels and traffic channels are mixed;

FIGS. 6A and 6B illustrate examples of a message frame which comprises control channels and traffic channels utilizing the unique Sync Words in accordance with one embodiment of the present invention; and FIGS. 6C and 6D illustrate examples of a message frame which comprises control channels and traffic channels utilizing unique control channel identification words in conjunction with the time slot sync words to form unique extended Sync Words in accordance with another embodiment of the present invention.

DETAILED DESCRIPTION OF THE ILLUSTRATED EMBODIMENTS

Figure 1:
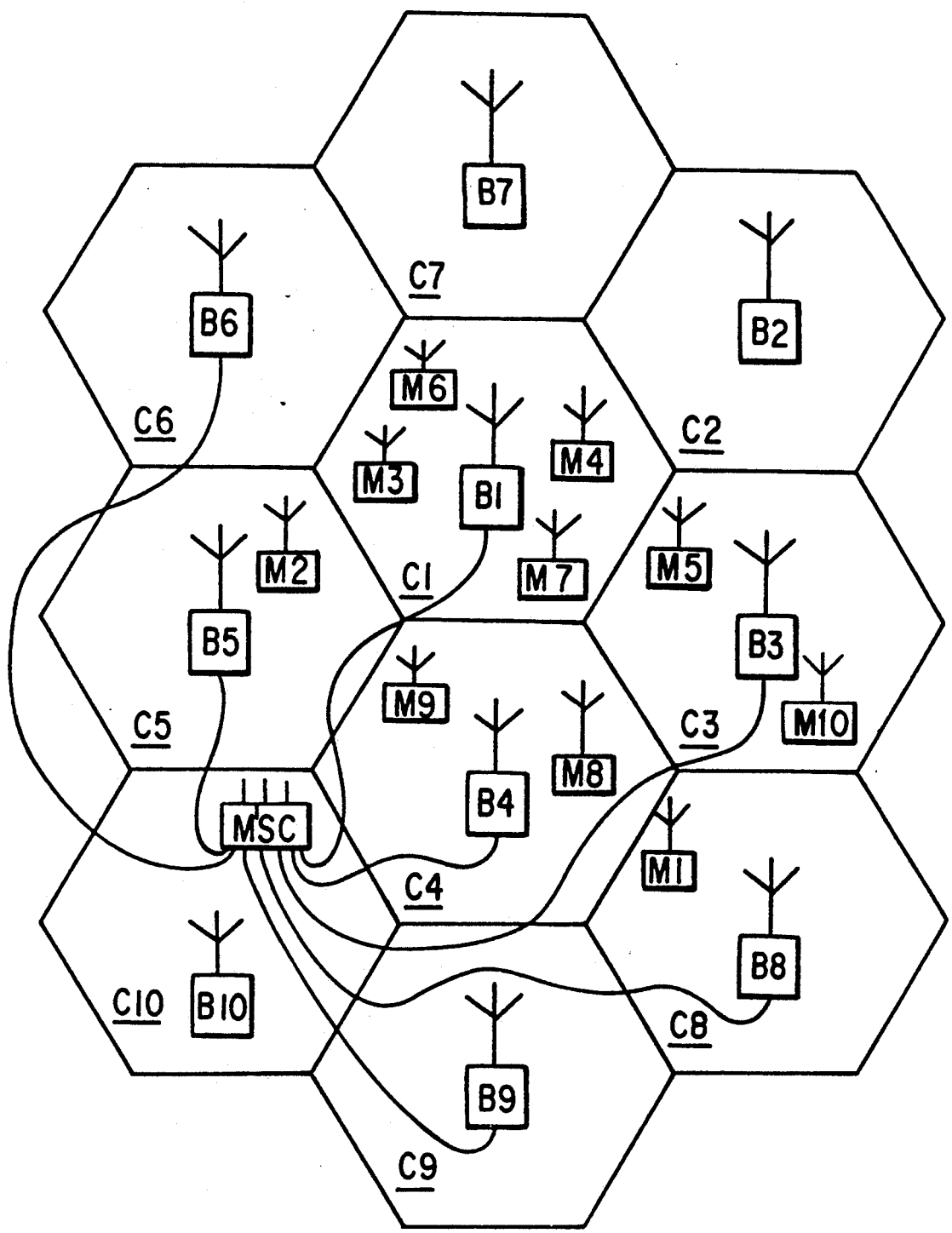
FIG. 1 illustrates a part of a cellular mobile radio system with cells, a mobile switching center, base stations and mobile stations.

FIG. 1 illustrates ten cells C1 to C10 in a cellular mobile radio system. In actual practice, the method and means according to the present invention are implemented in a cellular mobile radio system comprising many more cells than ten. However, for the purpose of explaining the present invention, ten cells is deemed to be sufficient.

For each of the cells C1 through C10 there is a base station B1 through B10, respectively, with the same number as the cell. FIG. 1 illustrates base stations situated in the vicinity of the center of the cell and having omni-directional antennas. The base stations of adjacent cells may, however, be allocated in the vicinity of cell borders and have directional antennas as is well known to those of ordinary skill in the art.

FIG. 1 also illustrates ten mobile stations M1 through M10 which are movable within a cell and from one cell to another cell. In actual practice, the method and means according to the present invention are implemented in a cellular mobile radio system comprising many more mobile stations than ten. In particular, there are usually many more mobile stations than there are base stations. However, for the purpose of explaining the present invention, the use of ten mobile stations is deemed to be sufficient. The system of FIG. 1 also includes a mobile switching center MSC. The mobile switching center is connected to all ten illustrated base stations by cables. The mobile switching center is also connected, by cables, to a fixed public switching telephone network or similar fixed network with ISDN facilities. All cables from the mobile switching center to the base stations and cables to the fixed network are not illustrated.

In addition to the mobile switching center illustrated, there may also be another mobile switching center connected by cables to other base stations than those illustrated in FIG. 1. Instead of cables, other means may be utilized for base to mobile station switching center communication, e.g., fixed radio links.

The cellular mobile radio system illustrated in FIG. 1 comprises a plurality of radio channels for communication. The system is designed both for analog information, e.g., speech, digitized analog information, digitized speech, and pure digital information. According to the system, the term connection is used for a communication channel established between a mobile station and another mobile station in the same system or another system, or a fixed telephone or terminal in a fixed network connected to the cellular mobile radio system. Thus, a connection may be defined as a call where two persons are able to talk to each other, but also may refer to a data communication channel where computers are exchanging data.

Figure 2:
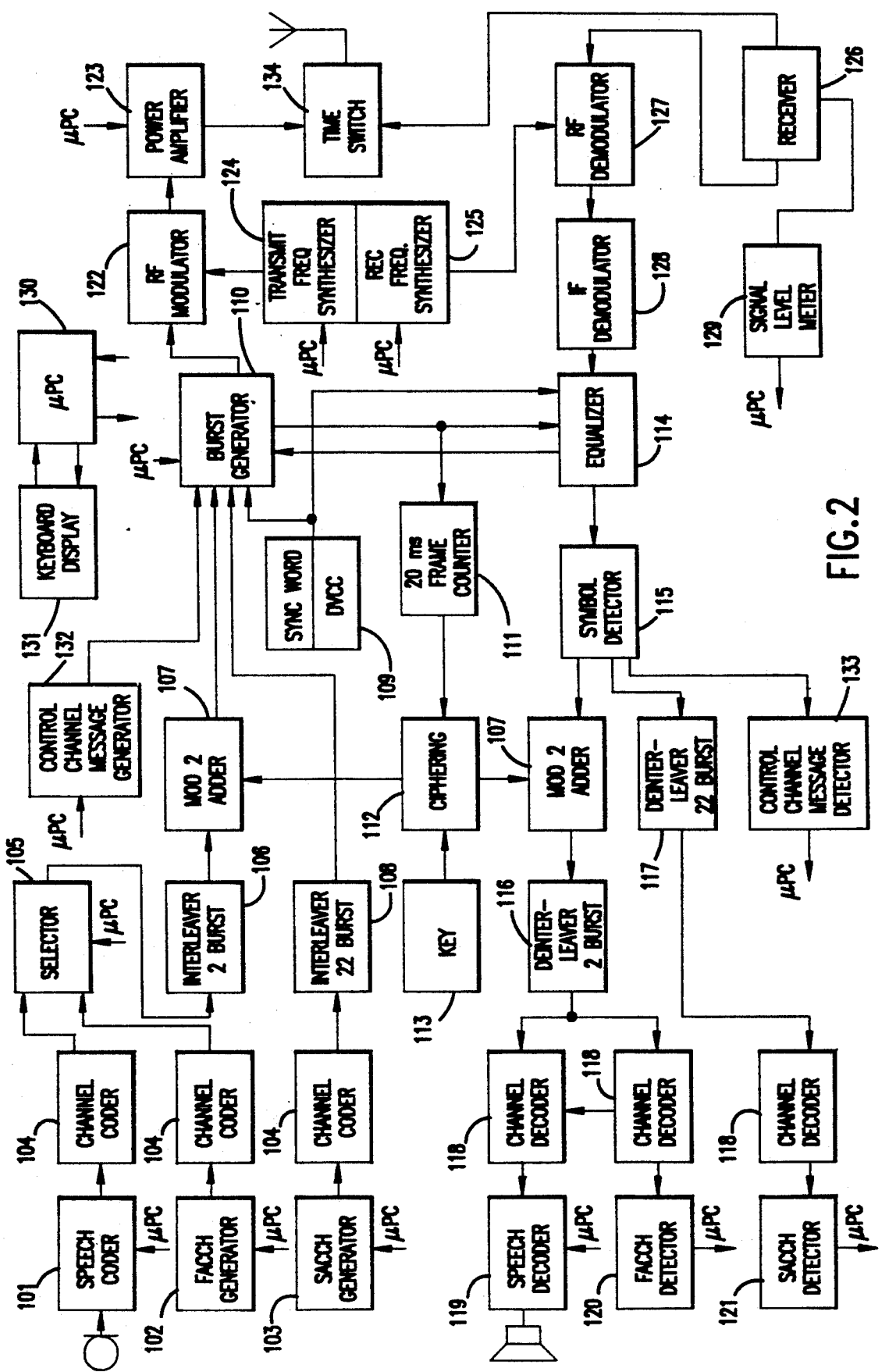
FIG. 2 illustrates a block diagram of a mobile station utilized in accordance with the present invention.

Referring now to FIG. 2, an embodiment of a mobile station that can be utilized in a cellular telephone system that operates in accordance with the present invention is illustrated. A speech coder 101 converts the analog signal generated by a microphone into a bit data stream. The bit data stream is then divided into data packages, according to the TDMA principle. A fast associated control channel (FACCH) generator 102 generates control and supervision signalling messages between the system and the mobile station and messages between the mobile station and the system. The FACCH message replaces a user frame (speech/data) whenever it is to be transmitted. A slow associated control channel (SACCH) generator 103 provides a continuous channel for the exchange of signalling messages between the base station and the mobile station and vice-versa. A fixed number of bits, e.g., twelve, is allocated to the SACCH for each time slot of the message train. Channel coders 104 are respectively connected to the speech coder 101, FACCH generator 102, and SACCH generator 103 for manipulating the incoming data in order to carry out error detection and correction. The techniques used by the channel coders 104 are convolutional encoding, which protects important data bits in the speech code, and cyclic redundancy check (CRC), wherein the perceptually significant bits in the speech coder frame, e.g., twelve bits, are used for computing a seven bit check.

A selector 105 is connected to the channel coders 104 associated with the speech coder 101 and the FACCH generator 102, respectively. The selector 105 is controlled by the microprocessor controller 130 so that at appropriate times user information over a particular speech channel is replaced with system supervision messages over FACCH. A two-burst interleaver 106 is coupled to the output of the selector 105. Data to be transmitted by the mobile station is interleaved over two distinct time slots. The 260 data bits, which constitute one transmitting word, are divided into two equal parts and are allotted two consecutive time slots. The effects of RAYLEIGH fading will be reduced in this manner. The output of the two-burst interleaver 106 is provided to the input of a modulo-two-adder 107 so that the transmitted data is ciphered bit by bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over SACCH over 22 time slots each consisting of 12 bits of information. The 22-burst interleaver 108 utilizes the diagonal principle so that as two SACCH messages are transmitted in parallel, the second message is displaced eleven bursts from the other message.

The mobile station further includes a Sync Word - DVCC generator 109 for providing the appropriate synchronization word (Sync Word) and DVCC which are to be associated with a particular connection. The Sync Word is a 28 bit word used for time slot synchronization and identification. The DVCC (digital verification color code) is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132 generating channel coded control messages. A message burst comprising data (260 bits), SACCH (12 bits), Sync Word (28 bits), coded DVCC (12 bits), and 12 delimiter bits, combined for a total of 324 bits are integrated according to the time slot format specified by the standard EIA/TIA IS-54. Under the control of the microprocessor 130, two different types of message bursts are generated by the burst generator 110: control channel message bursts from the control channel message generator 132 and voice/traffic message bursts. The control channel message is generated in accordance with commands from the microprocessor 130 and is sent on a digital control channel having the same burst formats as traffic channels but where the SACCH as well as the speech data normally generated in a voice/traffic burst are replaced by control information.

The transmitting of a burst, which is equivalent to one time slot, is synchronized with the transmitting of the other two time slots, and is adjusted according to the timing provided by the equalizer 114. Due to time dispersion, an adaptive equalization method is provided in order to improve signal quality. For further information regarding adaptive equalization techniques, reference should be made to U.S. patent Application Ser. No. 315,561, filed Feb. 27, 1989, and assigned to the same assignee. A correlator adjusts to the timing of the received bit stream. The base station is the master and the mobile station is the slave with respect to frame timing. The equalizer 114 detects the incoming timing and synchronizes the burst generator 110. The equalizer 114 also checks either the Sync Word and DVCC or a control channel identification word for identification purposes as will be explained in greater detail below.

A 20ms frame counter 111 is coupled to the burst generator 110 and so is the equalizer 114. The frame counter 111 updates a ciphering code utilized by the mobile station every 20ms, once for every transmitted full rate frame. It will be appreciated that according to this particular example, three time slots make up one frame. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by burst generator 110, which is to be transmitted, is forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2 bit symbols are transmitted as four possible changes in phase; $\pm \pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the carrier frequency is selected on command by a microprocessor controller 130. The amplified signal is passed through a time switch 134 before it reaches the antenna. The time switch 134 is synchronized to the transmitting sequence by the microprocessor controller 130.

A receiver carrier frequency is generated in accordance with the selected receiving channel by receiving frequency synthesizer 125. Incoming radio frequency signals are received by receiver 126, the strength of which are measured by signal level meter 129. The received signal strength value is then sent to the microprocessor controller 130. An RF demodulator 127 which receives the receiver carrier frequency from the receiving frequency synthesizer 125 and the radio frequency signal from receiver 126, demodulates the radio frequency carrier signal, thus generating an intermediate frequency. The intermediate frequency signal is then demodulated by an IF demodulator 128, which restores the original $\pi/4$-DQPSK - modulated digital information.

The restored information provided by IF demodulator 128 is supplied to the equalizer 114. A symbol detector 115 converts the received two bit symbol format of the digital data from the equalizer 114 to a single bit data stream. The symbol detector 115 in turn produces three distinct outputs. Control channel messages are sent to a control message detector 133 which supplies channel decoded and detected control channel information to the microprocessor controller 130. Any speech data/FACCH data is supplied to a modulo-two-adder 107 and a two-burst deinterleaver 116. The speech data/FACCH data is reconstructed by these components by assembling and rearranging information from two consecutive frames of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel decoder furthermore detects the distinction between the speech channel and any FACCH information, and directs the decoders accordingly. A speech decoder 119 processes the received speech data from the channel decoder 118 in accordance with a speech decoder algorithm (VSELP), and generates the received speech signal. The analog signal is finally enhanced by a filtering technique. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements made. The keyboard and display unit 131 enable an information exchange between the user and the base station.

Figure 3:
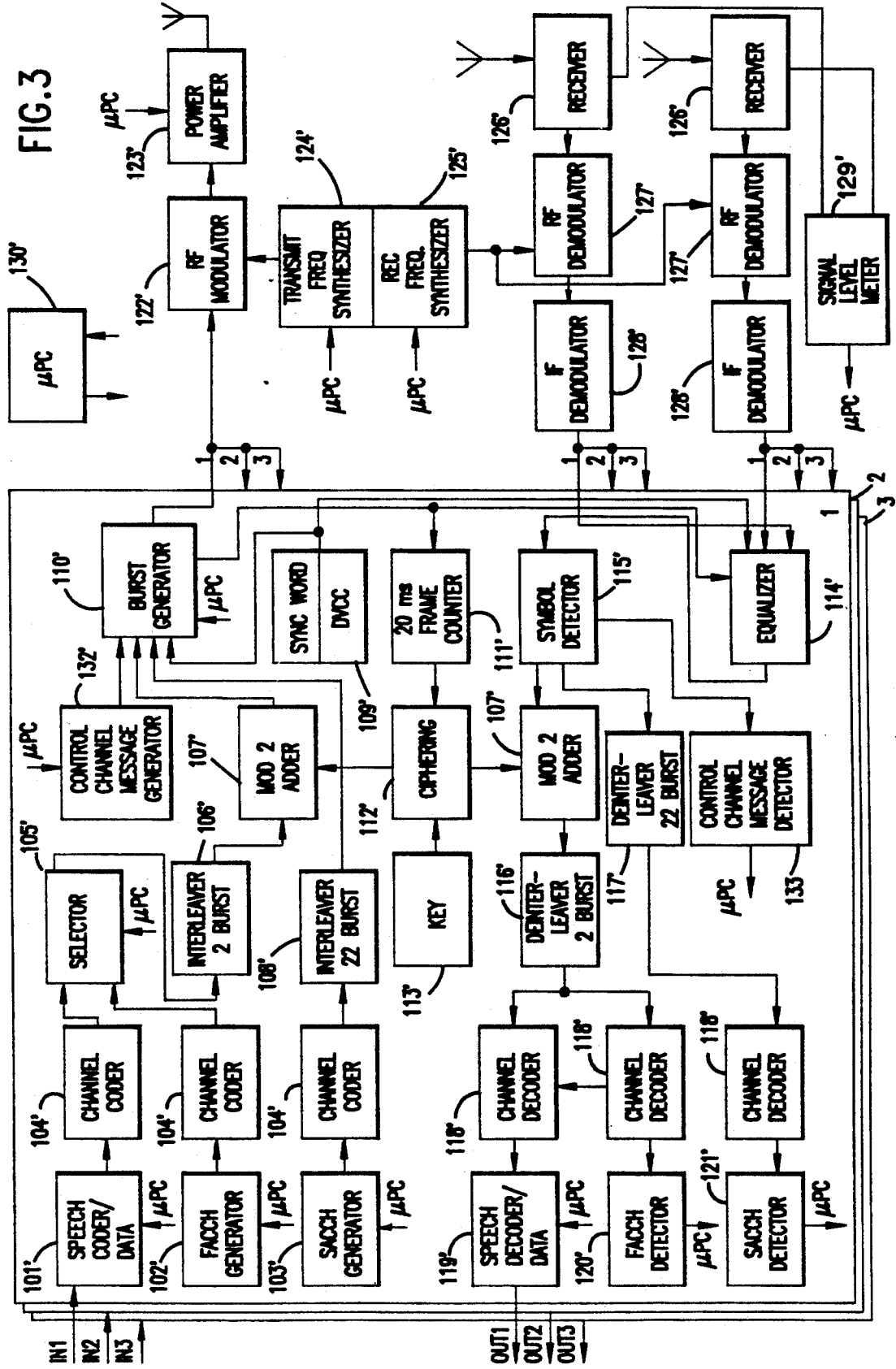
FIG. 3 illustrates a block diagram of a base station utilized in accordance with the present invention.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, minor distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station. Another difference is that a base station handles the communication of many mobiles as is represented in FIG. 3 as three channel controllers 1, 2, and 3, each of which handles one of three time slots of one frequency.

When power is applied to the mobile station, the microprocessor controller 130 executes an initialization procedure. Initially, the serving system parameters are retrieved, meaning that the preferred system, e.g., wire-line (B) or nonwire-line (A), is selected. Depending on the choice made, the scanning of the dedicated control channels belonging to the preferred system starts.

The receiving frequency synthesizer 125 is ordered by the by the microprocessor controller 130 to generate the frequency which corresponds to the first dedicated control channel. When the frequency is stable, the signal level meter 129 measures the signal strength, and thereafter the microprocessor controller 130 stores the signal strength value. The same procedure is performed for the frequencies corresponding to the remaining dedicated control channels, and a ranking based on the signal strength of each is made by the microprocessor controller 130. The receiving frequency synthesizer 125 is then ordered to tune to the frequency with the highest signal strength level so that the mobile station will be able to make attempts to synchronize to that channel.

The radio signal is captured by the receiver 126 and is demodulated according to the selected carrier frequency by RF modulator 127, and then demodulated by IF demodulator 128. Synchronization and primary analysis of the digital information in the radio signal is made in the equalizer 114. If the equalizer 114 manages to detect a Sync Word or control channel identification word identical to the Sync Word or control channel identification word stored in Sync Word generator 109, respectively, the equalizer 114 will lock to the time slot associated with that Sync Word or control channel identification word. The mobile station waits for the system parameter overhead message decoded by the control channel message detector 133 and transferred to the microprocessor controller 130. This message contains information about the identification of the system, the protocol capability, the number of available paging channels (PC), and their specific frequency allocation.

In the situation where the equalizer 114 is not able to recognize the Sync Word or control channel identification word with a specified period of time, the receiving frequency synthesizer 125 is ordered by the microprocessor controller 130 to tune to the channel with the next strongest signal. If the mobile station is unable to synchronize at this second choice, the microprocessor controller 130 orders a change of the preferred systems, e.g., from A to B or vice versa. Thereafter, the scanning of the dedicated control channels of the new preferred system will begin.

When the mobile station has received the system parameter overhead message, the paging channels are scanned in the same manner as the dedicated control channels, i.e., by measuring the signal strength and selecting the frequency with the strongest signal. Synchronization to the paging channels is then performed accordingly.

Upon successful synchronization on a paging channel, the mobile station will leave the initialization procedure and start an idle mode. The idle mode is characterized by four states, which are controlled by the microprocessor controller 130, and which are sequentially looped through as long as no access to the system is initiated. It should be noted that the scanning of the paging channels is performed whenever the bit error rate on the current paging channel increases above a certain level in order assure that the mobile station is listening to the paging channel with the strongest signal strength.

The first state associated with the idle mode is a continuous updating of the mobile station status, e.g., the number of and the location of existing access channels (AC). This information is carried to the mobile station in the system parameter overhead message on the paging channel, often referred to as a digital forward control channel (DFOCC). This message is decoded in the control channel message detector 133 and sent to the microprocessor controller 130. Certain messages transmitted from the base station in the system parameter overhead message demand responding actions from the mobile station, e.g., a rescan message will order the microprocessor controller 130 to restart the initialization procedure. As another example, a registration identity message from the base station will force the mobile station to make a system access in order to register in accordance with the system access mode described hereinbelow.

The second state associated with the idle mode relates to the situation where the mobile station attempts to match page messages transmitted by the base station. These mobile station control messages, which are sent over the DFOCC, are decoded in the control channel message detector 133 and analyzed by the microprocessor controller 130. If the decoded number matches the identification number of the mobile station, a connection to the base station will be prepared in the system access mode.

The third state of the idle mode involves listening to orders sent by the base station over the DFOCC. Decoded orders, such as an abbreviated alert, will be processed by the mobile station accordingly.

The fourth state in the idle mode involves the microprocessor controller 130 supervising the input from keyboard 131 for user activity, e.g., call initiating. A call origination results in the mobile station leaving the idle mode and starting the system access mode.

One of the primary tasks in the system access mode of the mobile station is the mobile station generating an access message. The access channels (AC) available to the mobile, which were updated during the idle mode, are now examined in a manner similar to the measuring of the dedicated control channels as previously described. A ranking of the signal strength of each is made, and the channel associated with the strongest signal is chosen. The transmitting frequency synthesizer 124 and the receiving frequency synthesizer 125 are tuned accordingly, and a service request message is sent over the selected channel in order to inform the base station about the type of access wanted, e.g., call origination, page response, registration request or order confirmation. After completion of this message, the amplifier 123 of the mobile station is turned off and the mobile station waits for further control messages on the DFOCC. Depending on the access type, the mobile station will then receive an adequate message from the base station.

If the access type is origination or paging, the mobile station is assigned a free traffic channel by the base station, and the mobile station leaves the system access mode to occupy that traffic channel. The mobile station will then tune the transmitting frequency synthesizer 124 and the receiving frequency synthesizer 125 to the frequencies associated with the chosen traffic channel. Thereafter, the equalizer 114 starts synchronizing. A time slot alignment procedure is controlled by the base station and is based on time delay measurements which are performed at the base station on the received signal. From this moment on, control messages exchanged between the base station and the mobile station are transferred over the fast associated control channel (FACCH) and the slow associated control (SACCH).

Messages from the microprocessor controller 130 are generated by the FACCH generator 102 or the SACCH generator 103, and data is error protection coded in the channel coder 104. The FACCH data is time multiplexed with speech data in the multiplexer 105, and interleaved over two bursts by the two burst interleaver 106. The data is then encrypted in the modulo-2 adder 107, which is controlled by the ciphering algorithm generated by ciphering unit 112. The SACCH data is interleaved over 22 bursts by 22 burst interleaver 108, and is then supplied to the burst generator 110 where the SACCH data is mixed with speech data, FACCH data, the Sync Word, and the DVCC from DVCC generator 109. The RF modulator 122 modulates the bit pattern according to the $\pi/4$-DQPSK principle. The power amplifier 123 is activated, and the power level is controlled by the microprocessor controller 130 during the time of the transmitted time slot.

Control messages from the base station to the microprocessor controller 130 of the mobile station are also transferred via the FACCH and SACCH. The symbol detector 115 converts the received four symbol pattern to a bit data stream which is directed to the speech decoder 119, FACCH detector 120, or SACCH detector 121, depending on the type of data used. Speech data and FACCH data are decrypted by the modulo-2 adder 107, and the two burst deinterleaver 116. The channel decoders 118 detect bit errors and inform the microprocessor controller 130 accordingly. The SACCH is deinterleaved over 22 bursts by 22-burst deinterleaver 117 before error detection is carried out in channel decoder 118.

Messages transmitted from the base station to the mobile station typically include alerting orders, requests to perform channel quality measurements, release call, and hand-off orders. Messages transmitted in the opposite direction are those initiated by the mobile station user, e.g., the release order. The last order implies that the user is finished with the call, and the mobile station will leave the control of the traffic channel and return to the initialization mode of operation.

Figure 4A:
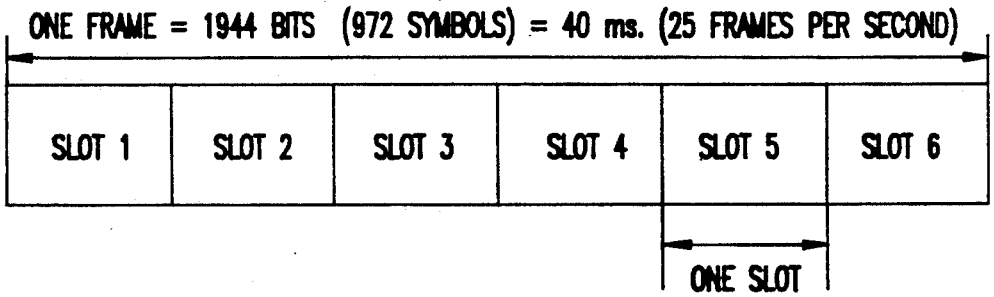
FIG. 4A illustrates the frame structure of a radio channel as utilized in accordance with the present invention.

FIGS. 4A-4E illustrate the structure of the digital channels according to the present invention and compatible with the digital traffic channels according to the EIA/TIA standard IS-54. FIG. 4A depicts the frame structure of a radio channel. According to this example, one radio channel frame consists of typically six time slots which include a total of 1,944 bits or 972 symbols. The frame is 40 ms in length with a data transmission rate of 25 frames per second. Each of the time slots are typically numbered from 1-6, each respectively including Sync Words of 28 bits as defined above.

Figure 4B:
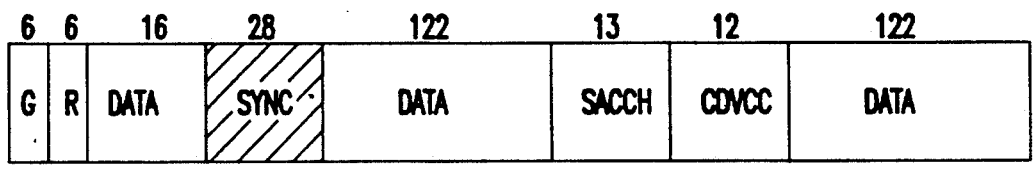
FIG. 4B illustrates a digital control channel time slot format for transmissions from a mobile station to a base or land station in one embodiment of the present invention.
Figure 4C:
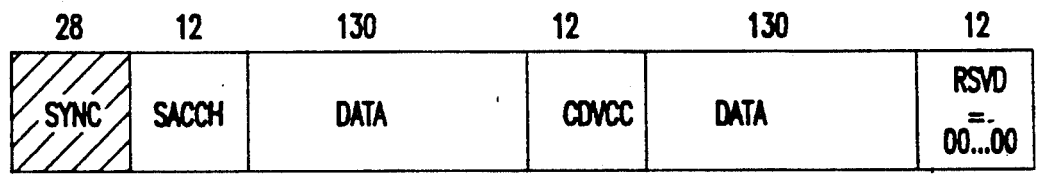
FIG. 4C illustrates a digital control channel time slot format for transmissions from a base or land station to a mobile station in one embodiment of the present invention.

FIGS. 4B and 4C illustrate a time slot format for transmissions from the mobile station to the land station and from the land station to the mobile station, respectively, for one embodiment of the present invention. The time slot formats commonly include 260 bits reserved for data transmission, 12 bits for a digital verification color code (DVCC), 12 bits for a slow associated control channel (SACCH), and 28 bits for synchronization and training data (SYNC). The slot format from the mobile station to the land station includes two 6 bit blocks for guard time (G) and ramp time (R) information. The slot format from the land station to the mobile station includes a 12 bit block which is reserved for future uses.

In a half rate alternative, each half rate voice/traffic channel utilizes one time slot of each frame. This implies that one frame comprises six half rate traffic channels with the slots being numbered sequentially 1, 2, 3, 4, 5, 6. According to the full rate alternative, each full rate traffic channel utilizes two equally spaced time slots of the frame, e.g., 1 and 4, 2 and 5, or 3 and 6. In this alternative, the time slots are numbered 1, 2, 3, and the configuration of one frame will therefore be 1, 2, 3, 1, 2, 3. It will be appreciated that for purposes of explanation it will be assumed that the present invention utilizes the full rate alternative for the following examples.

Figure 4D:
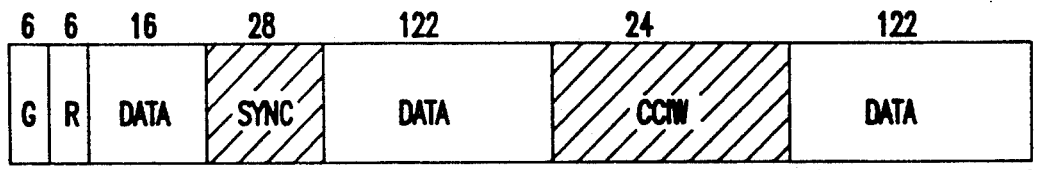
FIG. 4D illustrates a digital control channel time slot format for transmissions from a mobile station to a base or land station in another embodiment of the present invention.
Figure 4E:
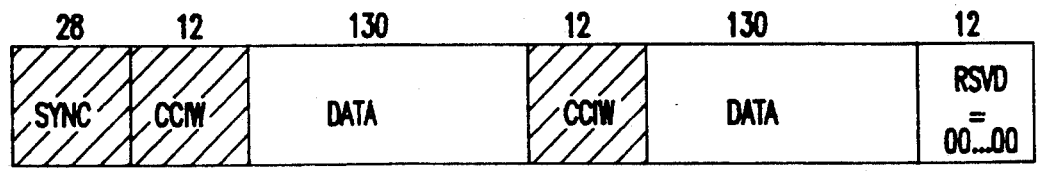
FIG. 4E illustrates a digital control channel time slot format for transmissions from a base or land station to a mobile station according to another embodiment of the present invention.

FIGS. 4D and 4E illustrate a time slot format structure of the digital control channels according to another embodiment of the present invention. FIG. 4E depicts the frame structure of the Digital Forward Control Channel (DFOCC) downlink from base to mobile and FIG. 4D depicts the structure of the Digital Reverse Control Channel (DRECC) uplink from mobile to base. In comparing the uplink and downlink control channel formats in FIGS. 4D and 4E with the corresponding traffic channel formats in FIGS. 4B and 4C, it can be seen that the formats are the same except for the SACCH and CDVCC fields.

The present invention addresses the problems which occur when the control channels of an associated base station are utilizing time slots in radio channel frames which also comprise time slots being utilized for traffic channels. According to the operation of the mobile station of the present invention, there are four distinct occasions when the mobile station is required to scan the control channels. The first occasion is during the initialization procedure when the dedicated control channels are scanned. The second occasion is during the initialization procedure and in the idle mode when the paging channels are being scanned. The third occasion is during the system access mode when the access channels are scanned. Finally, the paging channels are also scanned after a call termination.

It is now assumed that the mobile station during these paging occurrences is aware of which radio channel frequencies should be scanned and that the scanning procedure as described above is performed. A ranking of the signal strength of each radio channel frequency is made as previously described, and preferably more than two frequencies should be stored in the ranking list. The next processing step will be to synchronize the mobile station to one of the stored frequencies. However, in this example, a problem arises in that the control channels searched for are mixed with the traffic channels as illustrated in FIG. 5. FIG. 5 illustrates a standardized frame which comprises both control channels and traffic channels. In this example, time slots 1 and 4 are utilized as control channels and time slots 2, 3, 5 and 6 are utilized as traffic channels.

A conventional approach to this problem of distinguishing which slot is a control channel and which slot is a traffic channel, is programming the microprocessor controller 130 to detect this distinction. Unfortunately, this approach requires significant signal processing of the received signal including channel decoding and CRC calculations before a control channel may be distinguished from a traffic channel. In addition, if the data transmitted is ciphered, channel distinction would further be delayed by the deciphering required of the received signal.

The present invention offers alternative solutions to this problem. In a first preferred embodiment, the time slot being used as a control channel may be detected faster if these time slots are marked with uniquely defined Sync Words generated by the Sync Word generator 109' of the base station. In this situation, the equalizer 114 of the mobile station recognizes the uniquely defined Sync Words and identifies those particular time slots as control channels, thus distinguishing the time slots which are not being used as traffic channels. This operation allows for those channels which are not control channels to be eliminated rapidly so that the process of ranking the strongest control channel signals may be executed at a much faster rate.

FIGS. 6A and 6B illustrate examples of the implementation of the unique Sync Words (ESW) which define the time slot as a control channel. As the Sync Words associated with the six time slots in the frame according to the standard IS-54 are referred to as Sync Words 1, 2, 3, 4, 5, 6, it is proposed that the unique control channel Sync Words be referred to as Sync Words 7, 8, and 9 for purposes of explanation. Generally, unique Sync Word 7 will relate solely to time slots 1 and 4, Sync Word 8 relates solely to time slots 2 and 5, and Sync Word 9 relates solely to time slots 3 and 6.

FIG. 6A illustrates one frame which comprises one control channel and two traffic channels. Time slots 1 and 4 are utilized as control channels, and therefore have associated therewith the unique Sync Word 7. Time slots 2, 3, 5 and 6 are being used as traffic channels, and therefore have associated therewith the conventional Sync Words 2 and 3. FIG. 6B illustrates one frame which comprises two control channels and one traffic channel. Time slots 1, 2, 4 and 5 are used as two separate control channels and have associated therewith unique Sync Words 7 and 8, respectively. Time slots 3 and 6 are being utilized as a traffic channel, and therefore have associated therewith the conventional Sync Word 3.

The number of unique Sync Words required to implement the present invention varies depending on the number of time slots of the radio channel frame and the maximum number of time slots available for use as separate traffic channels or as separate control channels. The following examples demonstrate this point.

In a preferred embodiment described having a six-slot, radio channel frame using full- or half-rate traffic channels and full-rate control channels, nine unique Sync Words are required if every time slot can be used either as a traffic channel or a control channel. However, if only four out of six time slots can be used as two full rate control channels and all six time slots can be used either as full-rate or half-rate traffic channels, only eight unique Sync Words are required. In a half-rate traffic channel, including two radio channel frames, each having six time slots, twelve unique Sync Words are required if every time slot is to be used either as a full-rate or half-rate traffic or control channel.

When the radio channel frame includes only four time slots and every time slot can be used as either a full-rate or a half-rate traffic or control channel, then eight unique Sync Words are required. In a situation where the radio channel frame comprises only four time slots and only two out of four time slots can be used either as full-rate or half-rate traffic or control channels, then only six unique Sync Words are required. In a similar fashion, when the radio channel frame includes only three time slots and every time slot can be used either for a full-rate, separate traffic channel or a full-rate, separate control channel, then six unique Sync Words are required. When the radio channel frame includes more than six time slots, e.g., eight slots, more than twelve unique Sync Words may be required depending on the number of slots per channel and the number of time slots that may be used as either traffic or control channels. Thus, for example, sixteen unique Sync Words may be required.

The set of unique Sync Words performs dual functions of synchronization and channel identification. In general, every Sync Word should have good correlation properties, meaning that each Sync Word should have a low correlation with other Sync Words regardless of whether they are in-phase or out-of-phase with each other. Moreover, each Sync Word should also exhibit low correlation with itself when out of phase. Thus, Sync Words need to be determined within the context of a set of Sync Words. Because longer Sync Words provide better correlation properties, the larger the number of unique Sync Words required, the longer the Sync Words must be to meet the necessary correlation requirements. Unfortunately, longer Sync Words require more space in a burst and reduce space for traffic information, like speech or data. Thus, the determination of a set of Sync Words is often a compromise between correlation properties and length.

While there are various methods for correlating Sync Words, one method for correlating binary Sync Words is as follows. If each binary Sync Word includes n digits, there are $2^n$ possible Sync Word combinations. A total of m Sync Words having good correlation properties may then be chosen from the $2^n$ possible Sync Words. A computer may be programmed to test all possible Sync Word combinations provided that n is relatively small when compared to the number of arithmetic operations the computer can perform per unit time. Such testing is accomplished efficiently by first excluding Sync Words that have a high correlation with themselves when out of phase before correlations of different words are tested.

Of course, another method for determining a set of Sync Words is to use Sync Words already known and disclosed in the prior art literature. For example, if six or less 28-bit unique Sync Words are required, the Sync Words disclosed in the TIA IS-54 standard on U.S. cellular systems may be used. If eight or less 26-bit Sync Words are required, the Sync Words of the pan-European digital cellular system, abbreviated GSM, may be used.

For a given set of known Sync Words, various adaptations can be made to that set. For example, when a large number of Sync words are required and long Sync Words are acceptable, but only a small group of shorter Sync Words are available, the large number of Sync Words may be obtained by uniquely combining the shorter Sync Words. From P shorter unique Sync Words, a maximum number of P (P+1)/2 unique Sync Words may be obtained which are twice as long as the short Sync Words. Thus, from the short Sync Words A, B, C and D, long Sync Words AA, AB, AC, AD, BB, BC, BD, CC, CD, and DD may be obtained.

It may be desirable or necessary in some situations not to include additional Sync Words to designate those time slots which are control channels. Another preferred embodiment of the present invention offers an effective approach to resolve such a necessity as well as the problems with the conventional approach described above. A time slot being used as a control channel may be detected simply and quickly if those control channel time slots are identified with an unencrypted uniquely defined control channel identification word or words (CCIW), as illustrated in FIGS. 4D and 4E. The SACCH and CDVCC fields of the control channels include a control channel identification word (CCIW). The SACCH and the CDVCC are not required on the control channel and their associated fields are used in this embodiment of the present invention to identify a time slot as a control channel. Although not illustrated, any number of the control related bits, including the SACCH and/or CDVCC bits, may be used for the purpose of identifying time slots being used as control channels as opposed to a traffic channel. One advantage of this embodiment is that control fields are never encrypted so that any de-encryption is unnecessary. Another advantage is that no additional Sync Words need be defined.

As an example, a control channel identification word may be generated using simply the 12 bits of the CDVCC field. Out of the total number of possible CDVCC codes which may be generated in the CDVCC field, one or more of those codes is reserved for use as control channel identification word(s). Of course, for purposes of implementing the present invention, only one CCIW is necessary to designate a time slot as a control channel. However, if more than one CCIW is used, the number of different control channel identification words should not be too great, otherwise the number of CDVCC codes will be too restricted. To avoid bit patterns that are typically generated by the SACCH and/or CDVCC codes and to achieve low correlation between the CCIW's and the SACCH's and/or CDVCC's, only two different CCIW's are generated from the 24 bits of the SACCH and the CDVCC. Accordingly, the 24 bit control channel identification word (CCIW) is used to indicate that a time slot is a control channel. The 24 bit Sync Word is used only as a synchronization pattern to indicate the specific time slot number (time slot 1 to time slot 6).

If two or more different 24 bit control channel identification words are designated, each CCIW not only indicates that a channel is a control channel but also transmits information from the mobile to the base station or vice versa. In other words, for example, a first and second CCIW may differ. This difference is equivalent to one bit of information which may be used to communicate any number of useful messages between the mobile and base, e.g., when using several control channels including access, authentication, and ciphering functions requiring more than one time slot. The two patterns of 24 bits each must be chosen to have good correlation properties, meaning that each CCIW should have a low correlation with the other CCIW regardless of whether they are in-phase or out-of-phase with each other. Moreover, each CCIW should also exhibit low correlation with itself when out of phase.

The control channel identification word or words are generated by the Sync Word generator 109'of the base station in the downlink direction from base to mobile station in order to allow the mobile station to quickly scan the control channels. As described earlier, the CCIW's allow for those channels which are not control channels to be eliminated rapidly to increase the speed of selecting the strongest control channel signals. Moreover, no additional Sync Words are required to identify which time slots are control channels.

FIGS. 6C and 6D illustrate examples of the implementation of the control channel identification words which define a time slot as a control channel. As the Sync Words associated with the six time slots in the frame according to the standard IS-54 are generally referred to as Sync Words 1, 2, 3, 4, 5, 6, for purposes of describing FIGS. 6C and 6D in a manner similar to the description of FIGS. 6A and 6B, the unique control channel indicators on the control channels are referred to as extended Sync Words (ESW) X1, X2, and X3. Specifically, the extended Sync Words (ESW) include not only the standard Sync Words 1–6 but also the control channel identification words in the SACCH and CDVCC fields.

FIG. 6C illustrates one frame which includes one control channel and two traffic channels. Time slots 1 and 4 are utilized as control channels, and therefore have associated therewith the unique extended Sync Word (ESW) X1. Time slots 2, 3, 5 and 6 are used as traffic channels and therefore have associated therewith Sync Words 2 and 3. FIG. 6D illustrates one frame which comprises two control channels and one traffic channel. Time slots 1, 2, 4 and 5 are used as two separate control channels and have associated therewith unique extended Sync Words (ESW) X1 and X2, respectively. Time slots 3 and 6 are utilized as a traffic channel, and therefore have associated therewith the conventional Sync Word 3.

Accordingly, the present invention presents a method and system which allows for a more flexible use of the existing radio channels and the introduction of new control channels for control signalling. The method and system involve the use of control channels of an associated base station which directly correspond to certain time slots of a radio channel frame, which also comprises time slots being utilized for traffic channels. The time slots to be used as control channels are marked with a uniquely defined control channel indicator either in the form of a unique Sync Word or a unique control channel identification word. A mobile station is able to recognize the uniquely defined control channel indicator and identify the particular time slots as control channels, thus distinguishing the time slots which are not being used as control channels.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A system for utilizing certain time slots of a radio channel frame as communication channels, each time slot capable of being used for transmitting message signals between a mobile station and a base station in a cellular telephone network, said system comprising:
   message signal generating means for generating message signals to be transmitted in said time slots of said frame as a series of binary bits;
   synchronization word generating means for generating time slot synchronization words which are associated with each of said time slots, each time slot including channel indication information for indicating whether a time slot is a first type of channel or a second type of channel;
   frame producing means for producing a frame, which includes a plurality of said time slots, by allotting to each of said time slots a message signal and an associated synchronization word;
   transmitting means for transmitting said frame;
   receiving means for receiving said transmitted frame;
   detecting means for detecting said channel indication information; and
   determining means determining whether each of said time slots is to be utilized as a traffic channel or a control channel in response to detection of either said first type of channel or said second type of channel.

2. A system according to claim 1, wherein said first type of channel is a voice/data traffic channel.

3. A system according to claim 1, wherein said second type of channel is a control channel.

4. A system according to claim 1, wherein said channel indication information includes at least one unique synchronization word for designating that said associated time slot is to be used as a control channel.

5. A system according to claim 1, wherein said channel indication information includes at least one control channel identification word defined by at least some of said binary bits other than voice/data bits.

6. A method for utilizing certain time slots of a frame as communication channels, each time slot being used for transmitting message signals between a mobile station and a base station in a cellular telephone network, said method comprising the steps of:
   generating message signals to be transmitted in said time slots of said frame;
   generating synchronization words which are associated with each of said time slots, each time slot having associated therewith channel indication information for indicating whether a time slot is a first type of channel or a second type of channel;
   producing a frame, which includes a plurality of said time slots, by allotting to each of said time slots a message signal and an associated synchronization word;
   transmitting said frame from one of said base and mobile stations;
   receiving said frame at the other of said base and mobile station;
   detecting said channel indication information; and
   determining whether each of said time slots should be utilized as a traffic channel or a control channel in response to said detecting step.

7. A method for designating time slots of a frame, which includes time slots being utilized for traffic channels and control channels, said frames utilized for transmitting message signals between a base station and a mobile station in a cellular telephone system, comprising the steps of:
   generating at least one unique control channel identification word for designating at least one time slot as a control channel;
   producing a frame having at least one time slot with an associated control channel identification word combined therewith;
   detecting said at least one time slot with said associated control channel identification word; and
   utilizing said detected at least one time slot with said associated control channel identification word as a control channel.

8. The method according to claim 7, wherein said at least one control channel identification word is generated using preestablished control fields within each of said time slots.

9. The method according to claim 8, wherein said generating step generates two unique control channel identification words that both designate an associated time slot as a control channel and that individually convey additional message information.

10. A system for utilizing a plurality of time slots of a radio channel frame as communication channels, each time slot capable of being used for transmitting message signals between a mobile radio station and a base station in a cellular telephone network, said system comprising:
    message signal generating means for generating message signals to be transmitted in said time slots of said frame;
    synchronization word generating means for generating a plurality of synchronization words of a first type which are uniquely associated with a plurality of said time slots and for generating a plurality of synchronization words of a second type which are uniquely associated with at least one of said time slots;
    frame producing means for producing said radio channel frame by allotting to a plurality of said time slots in said frame a first type of message signal and an associated synchronization word of said first type and by allotting to at least one of said time slots a second type of message signal and an associated synchronization of said second type;
    transmitting means for transmitting said frame;
    receiving means for receiving said transmitted frame;
    detecting means for detecting the type of synchronization word associated with each of said time slots; and
    determining means for determining whether each of said time slots is to be utilized as a traffic channel or a control channel in response to a detection of a synchronization word either of said first type or said second type, said synchronization word of said first type of message signals designating a time slot as a channel transmitting said first type of message signal and said synchronization word of said second type designating a time slot as a channel transmitting said second type of message signal.

11. A system according to claim 10, wherein said channel transmitting said first type of message signal is a voice/data traffic channel and said channel transmitting said second type of message signal is a control channel.

12. A system according to claim 10, wherein said frame includes six time slots to which are allotted three communication channels for transmitting said message signals.

13. A system according to claim 12, wherein each of said six time slots of said frame may be associated with said synchronization words of said first type and four of said six time slots of said frame may be associated also with said synchronization word of said second type.

14. A system according to claim 13, wherein each of said four time slots may be designated as either a control channel or a voice/data channel depending on the type of synchronization word detected by said detecting means and the remaining two time-slots may be designated only as voice/data channels.

15. A system according to claim 14, wherein said synchronization words of said first type include six unique synchronization words and said synchronization words of said second type include two unique synchronization words for a total of eight unique synchronization words associated with said frame.

16. In a digital cellular radio telephone system of the type in which information is communicated between base stations of the system and mobile telephone units in frames, with each frame being divided into a plurality of time slots that correspond to respective digital communication channels, a method for enabling said digital communication channels to be alternatively and selectively used as traffic channels for the communication of voice and data information or control channels for the communication of control information, comprising the steps of:

establishing a set of synchronization words, each synchronization word being associated with one of the time slots in a frame, with the total number of synchronization words in said set being greater than the number of time slots in a frame, so that at least one time slot has two synchronization words associated therewith;

dividing said set of synchronization words into words of a first type and words of a second type, with each of the synchronization words of said first type being uniquely associated with a respective one of the time slots in a frame, and the synchronization words of said second type being uniquely associated with respective ones of the time slots in a frame;

transmitting segments of information in respective time slots of a frame; and transmitting one of said synchronization words with each segment of information, said one synchronization word being associated with the time slot in which the segment of information is transmitted and being of said first type when the segment of information is voice or data information and being of said second type when the segment of information is control information.

17. The method of claim 16, wherein the synchronization words in said set have low correlation with each other regardless of whether they are in-phase or out-of-phase with each other.

18. The method of claim 17, wherein each synchronization word in said set exhibits low correlation with itself when out-of-phase.

19. The method of claim 16, wherein each frame contains six time slots and said set of synchronization words contains at least eight synchronization words, with six of said synchronization words being of said first type and two of said synchronization words being of said second type, so that at least two of the time slots in a frame can be alternately used for the transmission of voice information or control information.

20. A system for utilizing a plurality of time slots of a radio channel frame as communication channels, each time slot capable of being used for transmitting message signals between a mobile radio station and a base station in a cellular telephone network, said system comprising:

message signal generating means for generating message signals to be transmitted in said time slots of said frame;

word generating means for generating a plurality of time slot synchronization words which are uniquely associated with a plurality of said time slots and for generating at least one control channel identification word which is uniquely associated with at least one of said time slots, wherein one of said time slot synchronization words and said at least one control channel identification word are combined to generate an extended synchronization word;

frame producing means for producing said radio channel frame by allotting to a plurality of said time slots in said frame a first type of message signal and an associated time slot synchronization word and by allotting to at least one of said time slots a second type of message signal and an associated extended synchronization word;

transmitting means for transmitting said frame;

receiving means for receiving said transmitted frame;

detecting means for detecting the synchronization word associated with each of said time slots; and determining means for determining whether each of said time slots is to be utilized as a traffic channel or a control channel in response to said detection means, wherein detection of said time slot synchronization word determines that a time slot is a traffic channel and detection of said extended synchronization word determines that a time slot is a control channel.

21. A system according to claim 20, wherein said frame includes six time slots to which are allotted three communication channels for transmitting said message signals.

22. A system according to claim 21, wherein each of said six time slots of said frame may be associated with said time slot synchronization words and four of said six time slots of said frame may be associated also with said extended synchronization words.

23. A system according to claim 20, wherein said control channel identification word includes some portion of the control information transmitted in said message signals.

24. A system according to claim 20, wherein said word generating means generates two control channel identification words each of which designate an associated time slot as a control channel and which convey different control information.

* * * * *